United States Patent
Yamaguchi

(10) Patent No.: US 6,352,373 B1
(45) Date of Patent: Mar. 5, 2002

(54) OPTICAL CONNECTOR

(75) Inventor: Toru Yamaguchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 102 days.

(21) Appl. No.: 09/611,372

(22) Filed: Jul. 6, 2000

(30) Foreign Application Priority Data

Aug. 5, 1999 (JP) .......................................... 11-222161

(51) Int. Cl.⁷ ................................................ G02B 6/38
(52) U.S. Cl. ........................... 385/72; 385/60; 439/599
(58) Field of Search ............................ 385/72, 60, 78, 385/58; 439/700, 599

(56) References Cited

U.S. PATENT DOCUMENTS

| | | | | |
|---|---|---|---|---|
| 4,690,494 A | * | 9/1987 | Hirose et al. .................. | 385/60 |
| 4,762,389 A | * | 8/1988 | Kaihara ........................ | 385/59 |
| 4,798,440 A | | 1/1989 | Hoffer et al. ............... | 350/96.2 |
| 6,059,461 A | * | 5/2000 | Aoki et al. .................... | 385/59 |
| 6,234,682 B1 | * | 5/2001 | Nagaoka et al. .............. | 385/59 |

FOREIGN PATENT DOCUMENTS

DE 198 57 622 1/1999

EP 0 967 502 12/1999

OTHER PUBLICATIONS

Copy of European Patent Office Communication including European Search Report for corresponding European Patent Application No. 00114331.2 dated Dec. 5, 2000.

* cited by examiner

Primary Examiner—Brian Sircus
Assistant Examiner—Brian S. Webb
(74) Attorney, Agent, or Firm—Armstrong, Westerman & Hattori, LLP

(57) ABSTRACT

An optical connector having a spring cap which easily fits on and hardly comes off from a plug housing has been provided. The optical connector contains an optical plug including: a ferrule assembly; a plug housing for receiving the ferrule assembly; and a spring cap fitting on the plug housing, wherein the plug housing includes a pair of guide rails formed on an upper surface of the plug housing and a pair of engaging projections each formed on right and left side surfaces of the plug housing, the spring cap includes a pair of side walls, each of which is divided into portions for establishing a portion to bend and a portion to control aging. A pair of engaging parts each engaging with the respective engaging projection of the plug housing is formed in the portion to bend and grooves having an inverse U-shape cross-section are formed at the portion to control aging for inserting the guide rail thereinto from one end thereof.

3 Claims, 6 Drawing Sheets

OPTICAL CONNECTOR

BACKGROUND OF THE INVENTION (1) Field of the Invention

This invention relates to an optical connector containing an optical plug, in which a spring cap is fitted on a plug housing.

(2) Description of the Related Art

An optical connector has been used when optical fibers (optical fiber cable) constructing multiple transmission circuits mounted in vehicles such as motorcars are connected to a transmitter, receiver or other cables.

The optical connector consists of an optical plug 1 shown in FIG. 7 and a receptacle (not shown in the figure) into which the optical plug 1 fits. The optical plug 1 consists of a pair of ferrule assemblies 2, a plug housing 3 and a spring cap 4, wherein the ferrule assemblies 2 are received in a pair of cavities 5 of the plug housing 3 and the spring cap 4 is fitted on the plug housing 3 from the rear thereof.

In the following, the construction of the optical plug 1 will be explained in detail.

Each ferrule assembly 2 consists of an optical fiber 6, a spring 7 and a ferrule 8, wherein the ferrule 8 is attached to an end of the optical fiber 6, around which the spring.7 is covered through in advance. A core 9 of the optical fiber 6 stick s out from a front end face of the ferrule 8 and one end of the spring 7 abuts on a rear end face of the ferrule 8.

The plug housing 3 is formed in rectangular box-shape, in which the cavities 5 are formed penetrating from the front to the rear of the plug housing 3. On a center of the upper surface of the plug housing 3, a locking arm 10 which is used when the plug housing 3 fits into the receptacle (not shown in the figure) is formed. At each rear end of the side surface of the plug housing 3, a pair of holding pieces 11 (only one of which shown in the figure), which holds an introduced optical fibers 6 in cooperation with a pair of holders 13 (explained later) of the spring cap 4, is formed.

The spring cap 4 is formed to be fitted on the rear of the plug housing 3, in which a pair of slits 12 for inserting the optical fibers 6 therein is formed on a pair of side walls and a part of rear wall of the spring cap 4. At the periphery of the slits 12 on the rear wall of the spring cap 4, a pair of the holders 13 (only one of which shown in the figure) having U-shape in cross-sectional view protrudes. A fitting part 14 of the spring cap 4 allows the spring cap 4 to fit on the plug housing 3. At a center of the upper wall of the spring cap 4, which faces the fitting part 14, a pair of protective walls 15 is formed to receive the locking arm 10. An opposite end of the spring 7 abuts on the rear wall of the spring cap 4.

As for the spring cap 4 of the above optical connector, since the spring cap 4 is simply fitted on the rear of the plug housing 3 by mean of the fitting part 14, disability in communication might take place under severe using conditions if things come to the worst.

That is, since the slits 12 having a width wide enough to insert at least the fibers 6 therein are formed over a wide range in the spring cap 4, when the optical connector is exposed at an elevated temperature for long period of time, the spring cap 4 might vary with time with a high probability, then an inconvenience such that the spring cap 4 opens widely in a direction shown by arrow P in FIG. 7 because of the slits 12 takes place.

When the spring cap 4 further varies with time and the spring cap 4 opens more widely, a holding power to hold the springs 7 deteriorates, resulting in not only increase in connecting loss between the optical plug 1 and the receptacle (not shown in the figure) and but also that the spring cap 4 might come off from the plug housing 3 and that disability in communication takes place if things come to the worst.

One measure to respond the problem mentioned above is to construct an optical plug 17 containing a spring cap 16 having no slit therein as shown in FIG. 8, said construction belonging to the conventional structure of the optical plug.

According to the above measure, the problem mentioned above can be solved, however, since the ferrule assemblies 19 must be formed after the spring cap 16 is connected to a pair of optical fibers 18 in advance, working efficiency becomes very low. Furthermore, since an inserting force between a pair of engaging parts 21 of the spring cap 16 and a pair of corresponding engaging projections 22 of the plug housing 20 becomes large, resulting in that the spring cap 16 becomes hard to be fitted on the plug housing 20.

Therefore, when the optical plug 17 having the structure mentioned above is employed, the problem different from that of the above optical plug 1 arises.

SUMMARY OF THE INVENTION

It is therefore an objective of the present invention to solve the above problems and to provide an optical connector, in which a spring cap easily fits on and hardly comes off from a plug housing.

In order to attain the above objective, the present invention is to provide an optical connector including an optical plug comprising: a ferrule assembly having a ferrule which is attached to an end of an optical fiber penetrated through a spring and can be abutted on one end of the spring; a plug housing for receiving the ferrule assembly; and a spring cap fitting on the plug housing by allowing an opposite end of the spring to abut thereon, wherein the plug housing includes a pair of guide rails formed on an upper surface of the plug housing and extended along an fitting direction of the spring cap with the plug housing and a pair of engaging projections each formed on right and left side surfaces of the plug housing, the spring cap includes a base facing to a bottom surface of the plug housing and a pair of side walls raised vertically from the base and each facing to said right or left side surface of the plug housing, a pair of said side walls each is divided along the fitting direction of the spring cap into portions for establishing a portion to bend and a portion to control aging, a pair of engaging parts each engaging with the respective engaging projection is formed on the portion to bend, grooves having an inverse U-shape cross-section are formed at the portion to control aging extending along the fitting direction of the spring cap with the plug housing by opening the base side of the spring cap for inserting the guide rail thereinto from one end thereof.

With the construction described above, since the engaging part of the spring cap engaging with the engaging projection of the plug housing is formed in the portion to bend, when the spring cap is fitted on the plug housing, an engagement of the engaging part with the engaging projection is completed after the side wall restores to its original state from its bent state.

The groove formed in the portion to control aging, into which the guide rail is inserted from one end of the groove, slides the guide rail therethrough until the engagement of the engaging part with the engaging projection is completed.

Since the groove is formed in inverse U-shape in cross-sectional view in the portion to control aging by opening the base side of the spring cap, when the spring cap is fitted on the plug housing, aging in a direction between the groove and the base of the spring cap can be restrained. In addition, because the groove has an inverse U-shape in cross-sectional view, aging in a direction between both side walls can be restrained.

Since the spring cap is constructed as described above, a portion for inserting the optical fiber is not required to be formed over a wide range in the spring cap like a slit in the conventional spring cap.

Consequently, as for the spring cap, the side wall in the portion to bend bends upon fitting of the spring cap with the plug housing and the groove in the portion to control aging inserts the guide rail therein so as to prevent the spring cap from aging.

A pair of the guide rails is disposed at the periphery of the upper surface of the plug housing so that each plane of the guide rail is the same with that of the respective right or left side surface of the plug housing.

With the construction described above, since the guide rail is disposed at the periphery of the upper surface of the plug housing, the corresponding groove is by no means situated at a position far from a plane of the side wall of the spring cap. That is, the distance from the side wall is kept short, thereby stiffness and strength of the groove become high.

An opposite end of the groove is in one body with a rear wall, on which said opposite end of the spring abuts, situating between a pair of said side walls of the spring cap.

With the construction described above, since the rear wall, on which the opposite end of the spring of the ferrule assembly abuts, supports the groove, thereby stiffness and strength of the groove become high.

DESCRIPTION OF THE PREFERRED EMBODIMENTS

In the following, a preferred embodiment of the present invention will be explained with reference to the attached drawings.

Figure 1:
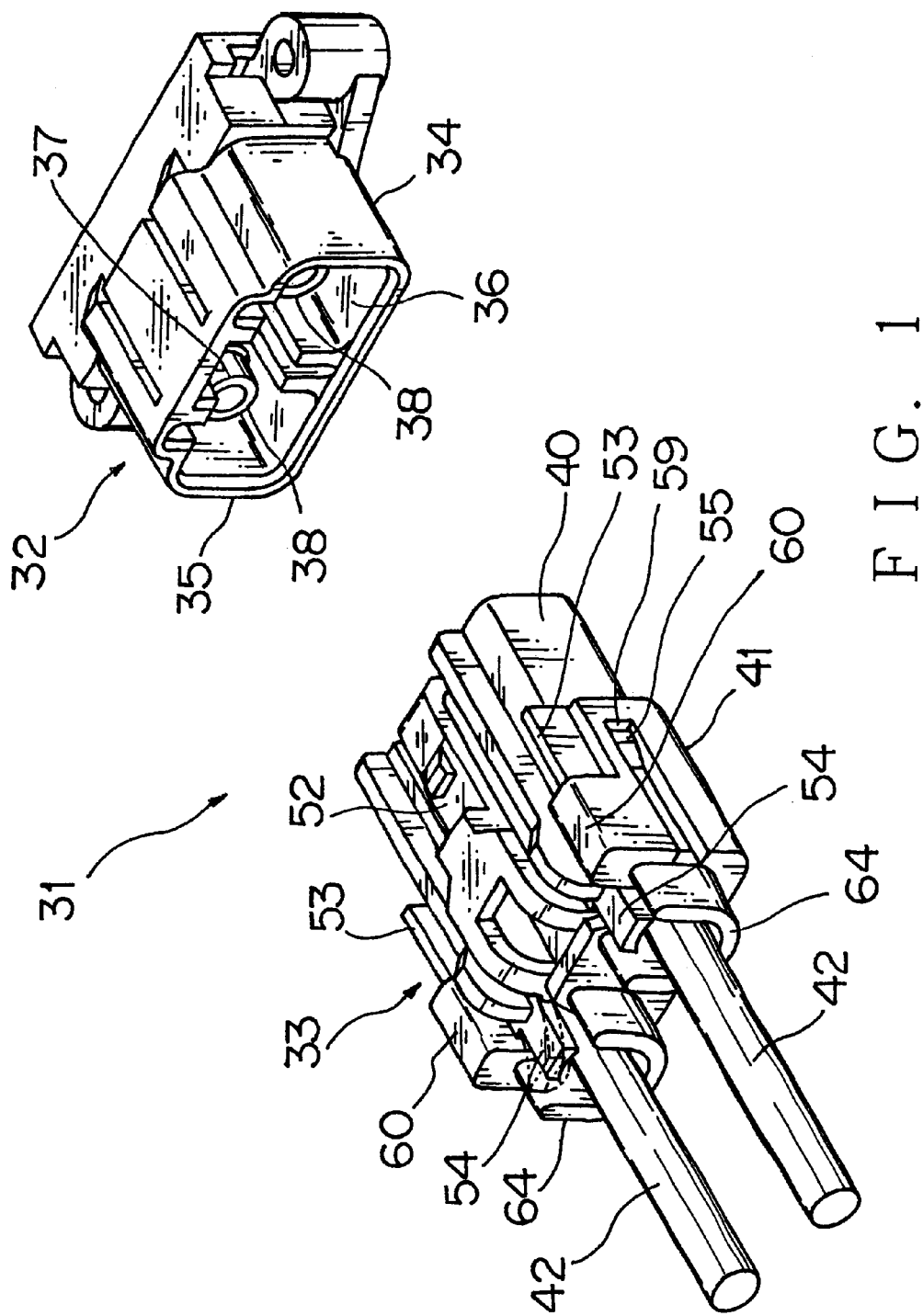
FIG. 1 is an exploded perspective view illustrating a preferred embodiment of an optical connector according to the present invention.
Figure 2:
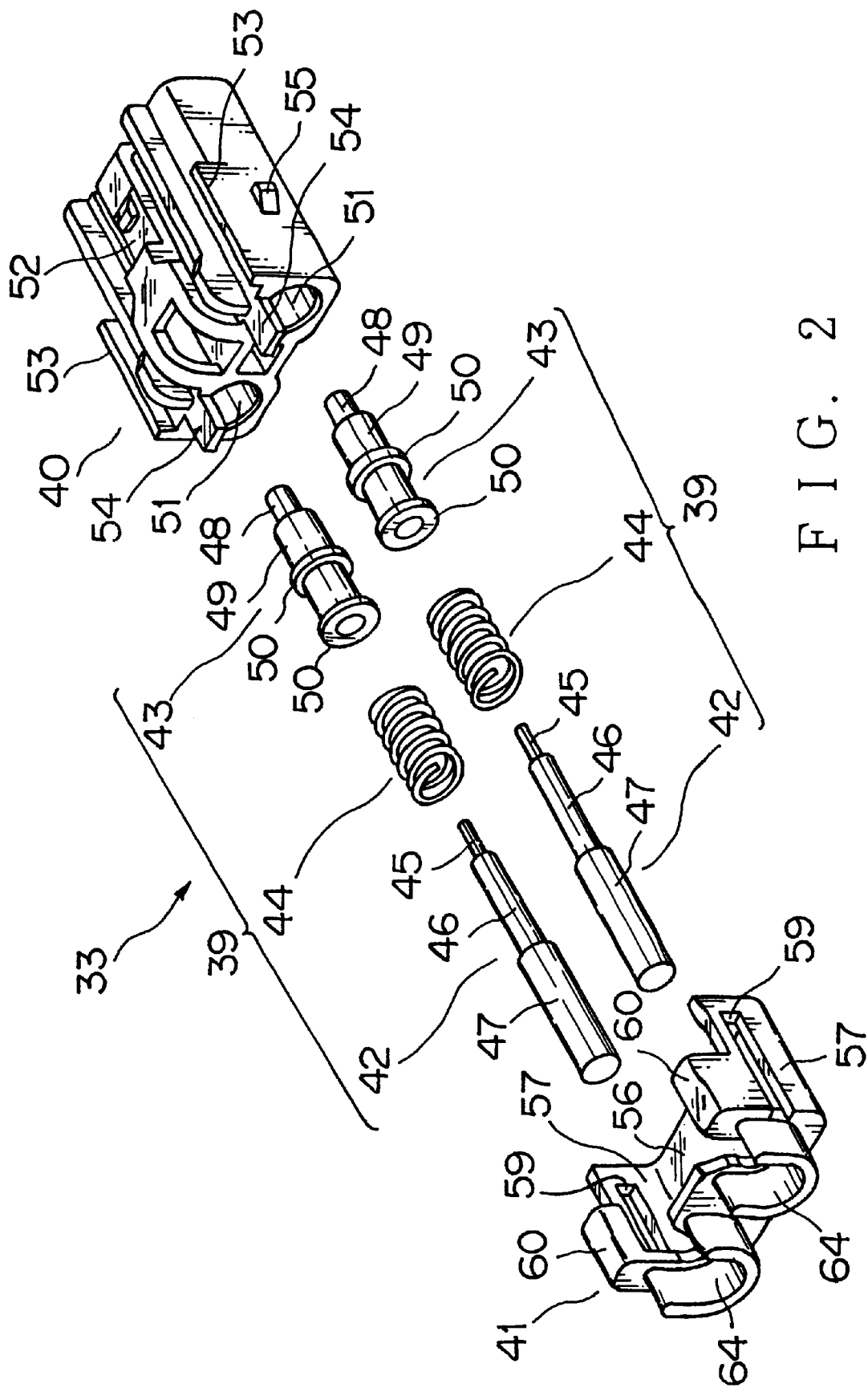
FIG. 2 is an exploded perspective view of the optical plug shown in FIG. 1.
Figure 3:
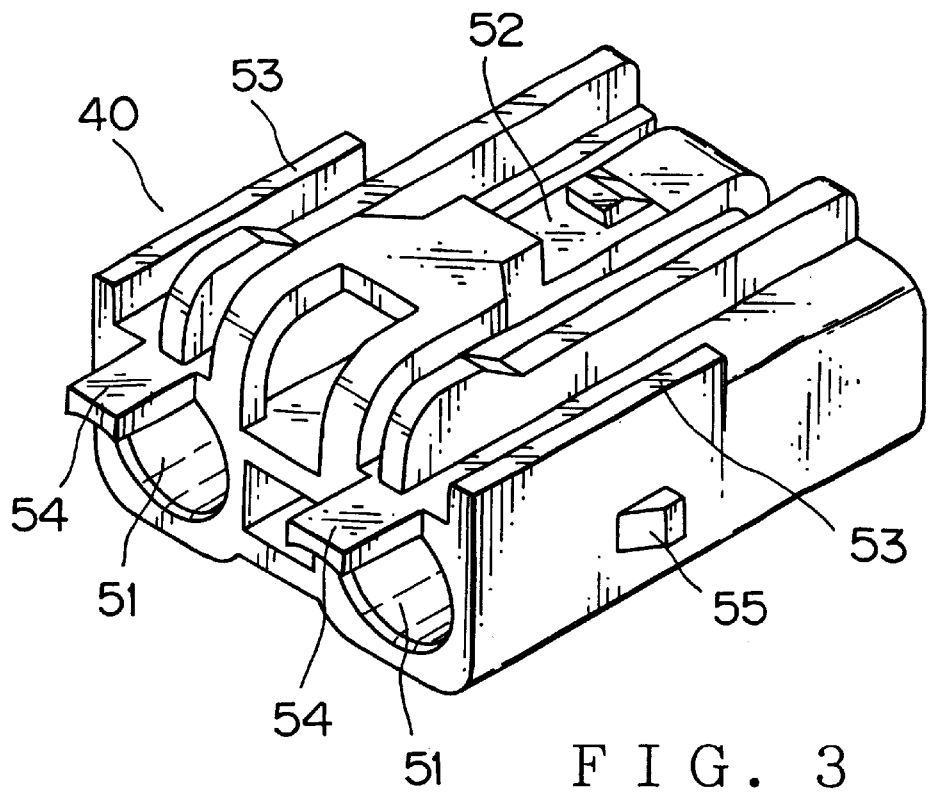
FIG. 3 is an enlarged perspective view of the plug housing shown in FIG. 2.
Figure 4:
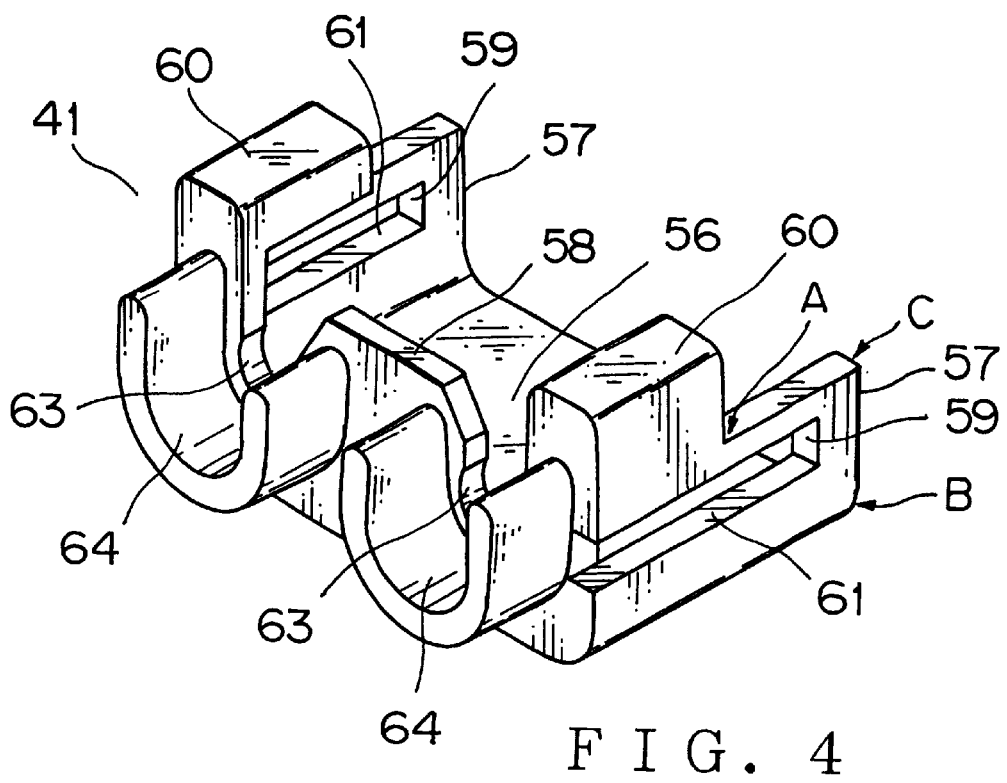
FIG. 4 is an enlarged perspective view of the spring cap shown in FIG. 2.
Figure 5:
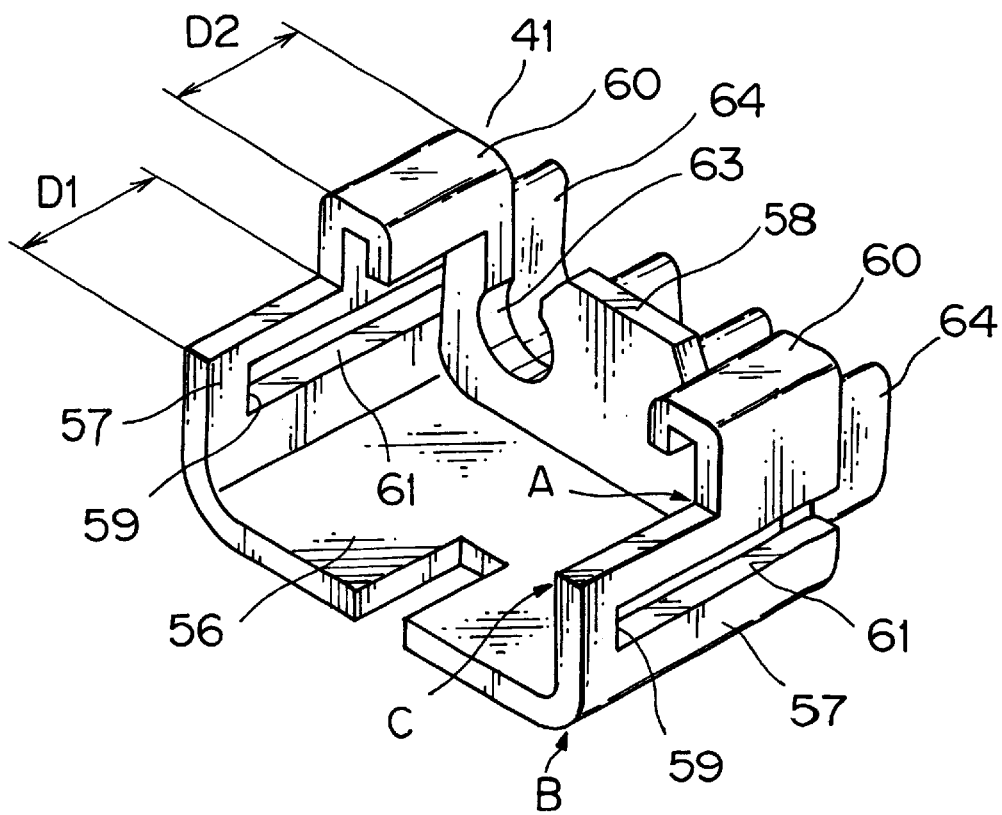
FIG. 5 is an enlarged perspective view of the spring cap viewed from the plug housing side.
Figure 6:
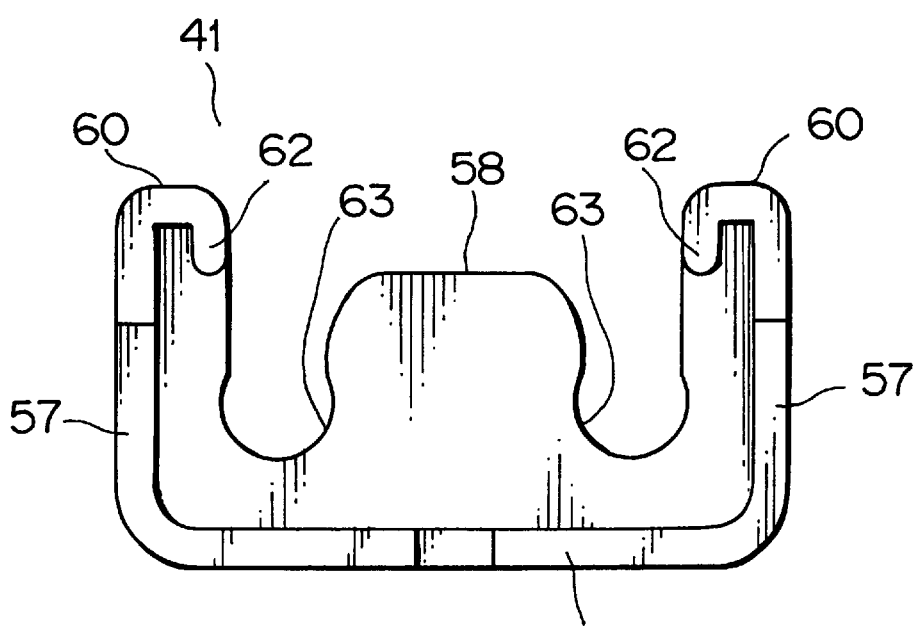
FIG. 6 is a front view of the spring cap.

FIG. 1 is an exploded perspective view illustrating a preferred embodiment of an optical connector according to the present invention; FIG. 2 is an exploded perspective view of the optical plug shown in FIG. 1; FIG. 3 is an enlarged perspective view of the plug housing shown in FIG. 2; FIG. 4 is an enlarged perspective view of the spring cap shown in FIG. 2; FIG. 5 is an enlarged perspective view of the spring cap viewed from the plug housing side; and FIG. 6 is a front view of the spring cap.

In FIG. 1, shown is an optical connector 31 for use in multiple transmission circuits mounted in vehicles such as motorcars, in which the optical connector 31 consists of a receptacle 32 and an optical plug 33.

The receptacle 32 contains a connector housing 34, front and rear of which are opened. The optical plug 33 is fitted into the receptacle 32 from an opening 35 in front of the connector housing 34. (An engaging cavity 36 is to be engaged with the optical plug 33, in which a locking groove 37 is formed to engage with a locking arm 52.

From a rear opening (not shown in the figure) of the connector housing 34, elements (not shown in the figure) constructing the receptacle 32 such as a sleeve, an optical element module and a cap having rectangular plate-shape for blocking the rear opening of the connector housing 34 are received in order in the same direction.

The sleeve and a ferrule 43 (explained later) are inserted into a receiving cylinder 38.

As shown in FIG. 2, the optical plug 33 consists of a pair of ferrule assemblies 39, a plug housing 40 into which the ferrule assemblies 39 are inserted and received, and a spring cap 41 fitting on the rear of the plug housing 40.

The ferrule assembly 39 consists of optical fiber 42, a ferrule 43 mounted at the end of the optical fiber 42, and a spring 44 into which the optical fiber 42 is inserted.

The optical fiber 42 consisting of a core 45, which is produced by using a transparent resin such as PMMA (poly(methyl methacrylate), i.e. methacrylic resin), a primary sheath 46 made of synthetic resin, and a secondary sheath 47 also made of synthetic resin, is mounted in a ferrule 43 with its end peeled off.

The ferrule 43 made of synthetic resin has a small-diameter cylindrical portion 48 and a large-diameter cylindrical portion 49, in which the core 45 of the optical fiber 42 is received in the small-diameter cylindrical portion 48 and the primary sheath 46 is received in the large-diameter cylindrical portion 49. The ferrule 43 and the optical fiber 42 are fixed tightly with each other using glue so as to prevent the optical fiber 42 from slipping out from the ferrule 43.

Two flanges 50 are formed around the corresponding large-diameter cylindrical portion 49 and the spring 44 is sandwiched between the flange 50 and the spring cap 41.

As shown in FIGS. 2 and 3, the plug housing 40, which is a rectangle-shaped case, has a pair of cavities 51 into which a pair of the ferrule assemblies 39 are received. At the upper surface (upper wall) of the plug housing 40, a locking arm 52 engaging into the locking groove 37 (see FIG. 1), a pair of guide rails 53 allowing the plug housing 40 to fit into the spring cap 41 and a pair of guide flanges 54 each for guiding the corresponding optical fiber 42 are formed in one body.

On right and left side surfaces of the plug housing 40, there is provided a respective nail-shaped engaging projection 55 (only one of a pair of the engaging projections being shown in FIG. 2) to be engaged with an engaging part 59 (explained later) of the spring cap 41.

The guide rail 53 is a rectangle-shaped piece, which extends along a fitting direction of the spring cap 41 with the plug housing 40, and is disposed on the same plane with that of the side surface (that is, formed at a respective side periphery of the upper surface (upper wall) of the plug housing 40 raising vertically from the upper surface), and formed from the rear end up to approximately the center of the plug housing 40.

The location of the guide rail 53 is not limited to the position described above. When the guide rail 53 is placed near to the center of the plug housing 40, a distance between a groove 60 (explained later) and the side wall of the spring cap 41 becomes longer, resulting in that stiffness of the groove 60 might decrease. Therefore, the position described above is most preferable.

The guide flange 54, which is an overhung projection formed at an introducing position of the optical fiber 42 that is introduced into the plug housing 40 from its rear end, has flexibility so as to prevent the optical fiber 42 from bending upward excessively.

In the present preferred embodiment, the optical fibers 42 are considered to possibly be bent upward excessively and the guide flange 54 is disposed (connectedly formed to the upper surface (upper wall) of the plug housing 40) at the upper periphery of the cavity 51 which opens at the rear end of the plug housing 40.

As shown in FIGS. 4 to 6, the spring cap 41 consists of a base 56 which faces to a bottom surface of the plug housing 40, a pair of side walls 57 each raised vertically from a respective side end of the base 56 and faces to a respective side surface of the plug housing 40, and a rear wall 58 which is raised vertically from a rear end of the base 56 and is contiguous to an end of the side walls 57. As described above, the spring cap 41 is formed so as to fit on the rear of the plug housing 40 (see FIG. 3).

As shown in FIG. 5, as for each side wall 57, a portion D1 to allow the side wall 57 to bend so that the engaging projection 55 can engage with the engaging part 59 and a portion D2 to control aging of the spring cap 41, both of which are divided from each other along the fitting direction, are formed. In the portion D1 to allow the side wall 57 to bend, a pair of the engaging part 59 each engaging to a respective engaging projection 55 (see FIGS. 3 and 4) is formed. In the portion D2 to control aging of the spring cap 41, a pair of grooves 60 is formed, along each of which the respective guide rail 53 slides when the spring cap 41 is fitted on the plug housing 40.

Each engaging part 59 is positioned at a front end of a respective slit 61 formed in the respective side wall 57 and engages with the respective engaging projection 55. As shown in FIG. 5, since the engaging part 59 is located at the plug housing 40 side in reference to a line formed by connecting two points shown by arrows A and B, a free end of the side wall 57 shown by arrow C bends and spreads upon the fitting of the spring cap 41 with the plug housing 40, then the engaging part 59 can easily engage with the engaging projection 55 once the free end of the side wall 57 climbs over the engaging projection 55.

Since each slit 61 is formed on the respective side wall 57, stiffness of the side wall 57 decreases, thereby the free end of the side wall 57 bends easily.

The groove 60 is formed in inverse U-shape in cross-sectional view extending along the fitting direction of the spring cap 41 with the plug housing 40 by opening the base 56 side of the spring cap 41, then the guide rail 53 is inserted into the groove 60 from one end of the groove 60. An opposite end of the groove 60 is closed by a rear wall 58 of the spring cap 41.

As shown in FIG. 6, an front end 62 of the groove 60 is away from the side wall 57 by a distance approximately. corresponding to a thickness of the guide rail 53, that is, the front end 62 is formed at a minimal distance from the side wall 57. Therefore, stiffness of the groove 60 is very high in combination with that the opposite end of the groove 60 is closed. Consequently, the spring cap 41 can be utilized with no problem even under severe using conditions.

As for the rear wall 58, there are formed a pair of openings 63 each for inserting the respective optical fiber 42 (see FIG. 2), on which one end of the spring 44 (see FIG. 2) abuts, and a pair of holders 64 formed in inverse U-shape in cross-sectional view each for holding the respective optical fiber 42 introduced from the opening 63 of the spring cap 41.

Figure 7:
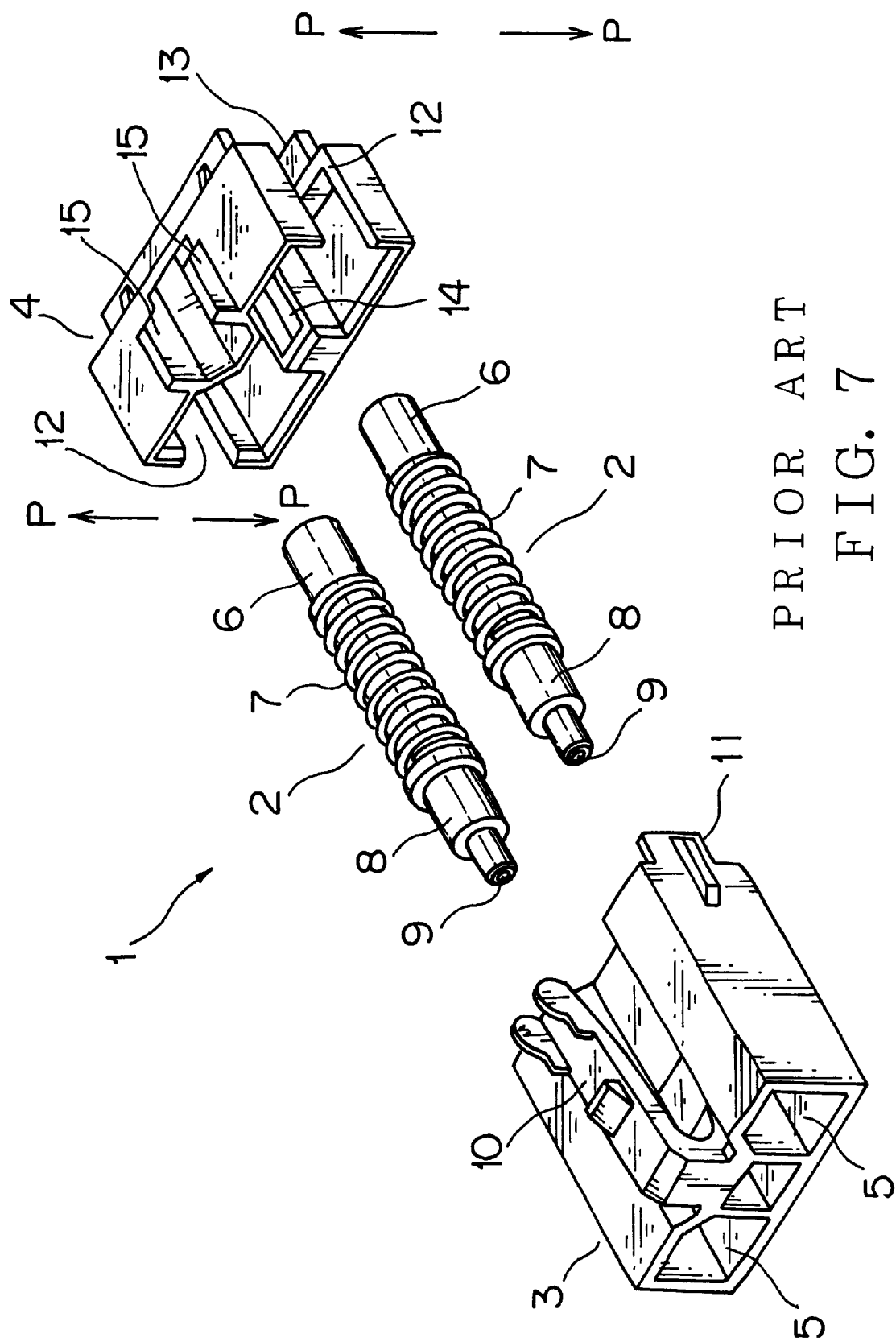
FIG. 7 is an exploded perspective view illustrating one conventional optical plug.
Figure 8:
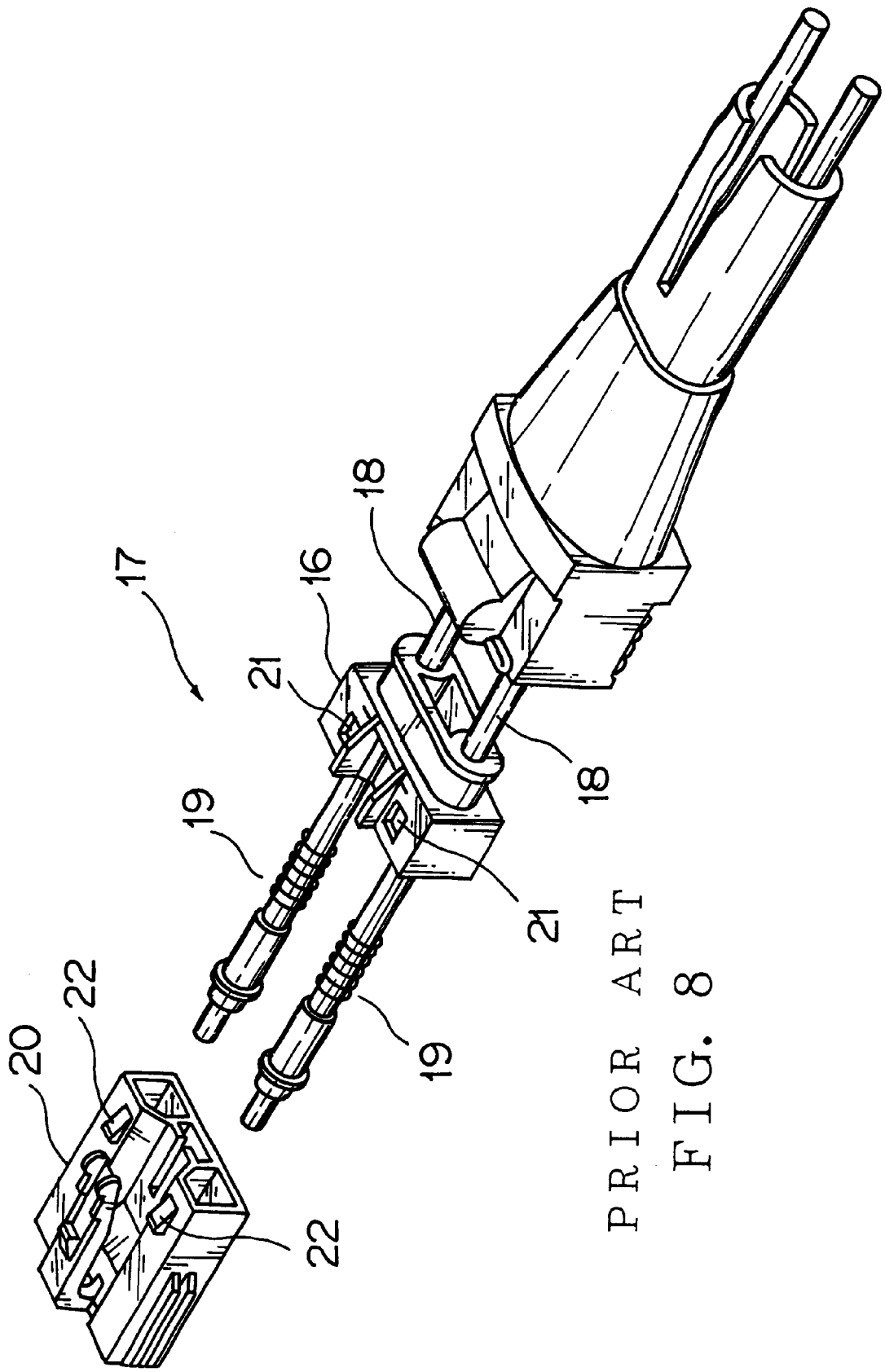
FIG. 8 is an exploded perspective view illustrating another conventional optical plug.

The opening 63 for inserting the optical fiber 42 is a slit formed in U-shape by cutting off the rear wall 58 from its upper end, a cut area of which is significantly narrower than that of the slit 12 (see FIG. 7) of the conventional optical plug.

The holder 64 is protrusionly formed along the cutting shape of the opening 63 and closed its open side by the guide flange 54 of the plug housing 40 after the fitting of the spring cap 41 on the plug housing 40 (see FIG. 1).

When the optical plug 33 fits into the receptacle 32, each receiving cylinder 38 enters into the plug housing 40 and each small-diameter cylindrical portion 48 of the respective ferrule assembly 39 simultaneously enters into the corresponding receiving cylinder 38. Each large-diameter cylindrical portion 49 of the respective ferrule assembly 39 abuts on a front end of the receiving cylinder 38 and the spring 44 gives a moderate contact pressure therebetween.

In the above situation, a front end of the ferrule assembly 39 and the sleeve are arranged with making minimum gap (not shown in the figure) therebetween. The optical element module and the sleeve are also arranged with making minimum gap (not shown in the figure) therebetween.

As explained with reference to FIGS. 1 to 6, since the engaging part 59 of the spring cap 41 engaging with the engaging projection 55 of the plug housing 40 is formed in the portion D1 of the side wall 57 to allow the side wall 57 to bend, when the spring cap 41 fits on the plug housing 40, the side wall 57 in the portion D1 bends and then, the engagement of the engaging part 59 with the engaging projection 55 is completed after the side wall 57 restores to its original state.

The groove 60 formed in the portion D2 to control aging of the spring cap, into which the guide rail 53 is inserted from one end of the groove 60, slides the guide rail 53 therethrough until the engagement of the engaging part 59 with the engaging projection 55 is completed.

Since the groove 60 is formed in inverse U-shape in cross-sectional view with opening the base 56 side of the spring cap 41, when the spring cap 41 is fitted on the plug housing 40, aging in a direction between the groove 60 and the base 56 of the spring cap 41 can be restrained. In addition, because the groove 60 has an inverse U-shape in cross-sectional view, aging in a direction between both side walls 57 can be restrained.

As for the spring cap 41, the side wall 57 in the portion D1 bends upon fitting of the spring cap. 41 with the plug housing 40 and the groove 60 in the portion D2 inserts the guide rail 53 thereinto so as to prevent the spring cap from aging. Therefore, the spring cap 41 easily fits on the plug housing 40 and hardly comes off from the plug housing 40 even under severe using conditions.

The aforementioned preferred embodiment is described to aid in understanding the present invention and variations may be made by one skilled in the art without departing from the spirit and scope of the present invention.

The optical connector according to the present invention can be applied to an optical connector for use in bilateral communication system employed single core-type optical fibers.

As described above, an optical connector according to the present invention includes an optical plug comprising: a ferrule assembly having a ferrule which is attached to an end of an optical fiber penetrated through a spring and can be abutted on one end of the spring; a plug housing for receiving the ferrule assembly; and a spring cap fitting on the plug housing by allowing an opposite end of the spring to abut thereon, wherein the plug housing includes a pair of guide rails formed on an upper surface of the plug housing and extended along an fitting direction of the spring cap with the plug housing and a pair of engaging projections each formed on right and left side surfaces of the plug housing, the spring cap includes a base facing to a bottom surface of the plug housing and a pair of side walls raised vertically from the base and each facing to said right or left side surface of the plug housing, a pair of said side walls each is divided along the fitting direction of the spring cap into portions for establishing a portion to bend and a portion to control aging, a pair of engaging parts each engaging with the respective engaging projection is formed on the portion to bend, grooves having an inverse U-shape cross-section are formed at the portion to control aging extending along the fitting direction of the spring cap with the plug housing by opening the base side of the spring cap for inserting the guide rail thereinto from one end thereof.

Since the engaging part of the spring cap engaging with the engaging projection of the plug housing is formed in the portion of the side wall to allow the side wall to bend, when the spring cap is fitted on the plug housing, an engagement of the engaging part with the engaging projection is completed after the side wall restores to its original state from its bent state.

The groove formed in the portion to control aging of the spring cap, into which the guide rail is inserted from one end of the groove, slides the guide rail therethrough until the engagement of the engaging part with the engaging projection is completed.

Since the groove is formed in inverse U-shape in cross-sectional view in the portion to control aging with opening the base side of the spring cap, when the spring cap is fitted on the plug housing, aging in a direction between the groove and the base of the spring cap can be restrained. In addition, because the groove has an inverse U-shape in cross-sectional view, aging in a direction between both side walls can be restrained.

Since the spring cap is constructed as described above, a portion for inserting the optical fiber needs not to be formed over a wide range in the spring cap like a slit in the conventional spring cap.

Consequently, as for the spring cap, the side wall in the portion to bend bends upon fitting of the spring cap with the plug housing and the groove in the portion to control aging inserts the guide rail therein so as to prevent the spring cap from aging, thereby the spring cap easily fits on the plug housing and hardly comes off from the plug housing.

Since a pair of the guide rails is disposed at the periphery of the upper surface of the plug housing so that each plane of the guide rail is the same with that of the respective right or left side surface, strength of the groove becomes high. That is, since the guide rail is disposed at the position described above, the corresponding groove is by no means situated at a position far from a plane of the side wall of the spring cap. That is, the distance from the side wall is kept short, thereby stiffness and strength of the groove become high.

Consequently, the spring cap further hardly comes off from the plug housing.

Since the opposite end of the groove is in one body with the rear wall, on which said opposite end of the spring of the ferrule assembly abuts, situating between a pair of said side walls of the spring cap, the groove is supported by the rear wall, thereby stiffness and strength of the groove become high.

Consequently, the spring cap furthermore hardly comes off from the plug housing.

What is claimed is:

1. An optical connector including an optical plug comprising:
    a ferrule assembly having a ferrule which is attached to an end of an optical fiber penetrated through a spring and can be abutted on one end of the spring;
    a plug housing for receiving the ferrule assembly; and
    a spring cap fitting on the plug housing by allowing an opposite end of the spring to abut thereon, wherein the plug housing includes a pair of guide rails formed on an upper surface of the plug housing and extended along an fitting direction of the spring cap with the plug housing and a pair of engaging projections each formed on right and left side surfaces of the plug housing, the spring cap includes a base facing to a bottom surface of the plug housing and a pair of side walls raised vertically from the base and each facing to said right or left side surface of the plug housing, a pair of said side walls each is divided along the fitting direction of the spring cap into portions for establishing a portion to bend and a portion to control aging, a pair of engaging parts each engaging with the respective engaging projection is formed on the portion to bend, grooves having an inverse U-shape cross-section are formed at the portion to control aging extending along the fitting direction of the spring cap with the plug housing by opening the base side of the spring cap for inserting the guide rail thereinto from one end thereof.

2. The optical connector according to claim 1, wherein a pair of the guide rails is disposed at the periphery of the upper surface of the plug housing so that each plane of the guide rail is the same with that of the respective right or left side surface of the plug housing.

3. The optical connector according to claim 1 or 2, wherein an opposite end of the groove is in one body with a rear wall, on which said opposite end of the spring abuts, situating between a pair of said side walls of the spring cap.

* * * * *